May 7, 1940.  G. E. KLOOTE  2,199,938
FLOOR PANEL FOR AIRCRAFT
Filed Feb. 10, 1938   2 Sheets-Sheet 1
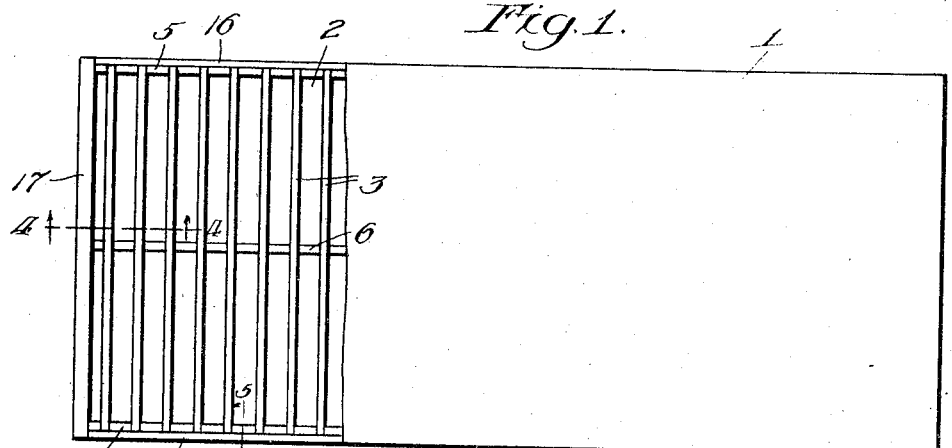
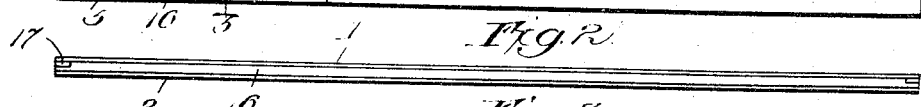
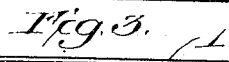
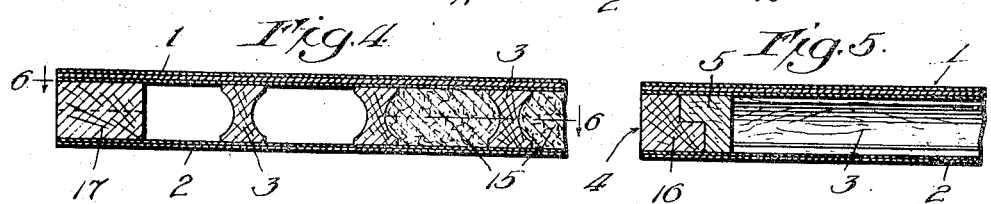
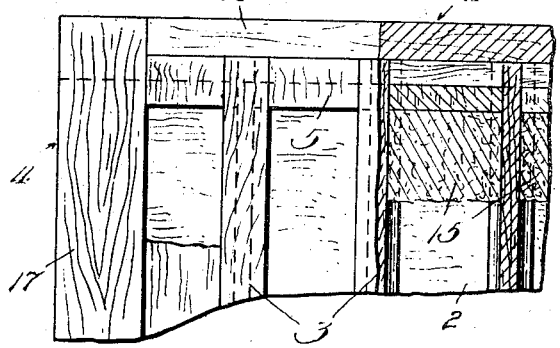
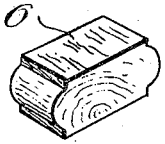
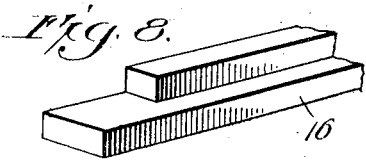
Inventor
George E. Kloote,
by Wm. F. Freudenreich
Atty.

May 7, 1940.  G. E. KLOOTE  2,199,938
FLOOR PANEL FOR AIRCRAFT
Filed Feb. 10, 1938   2 Sheets-Sheet 2
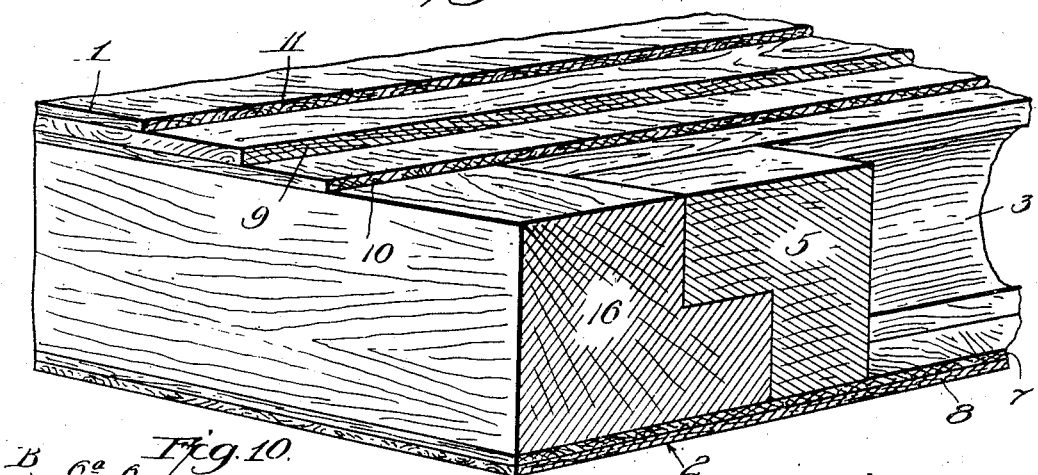
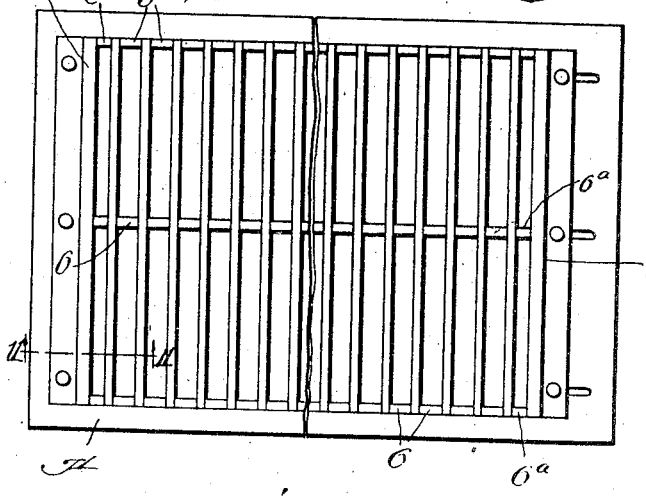
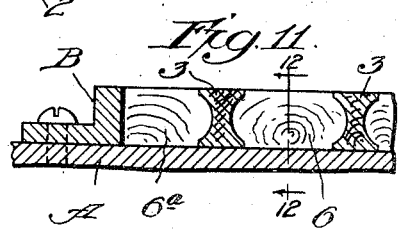
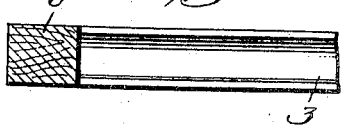
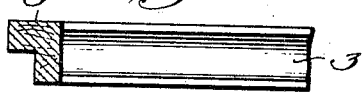
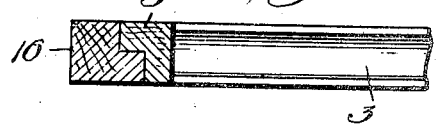
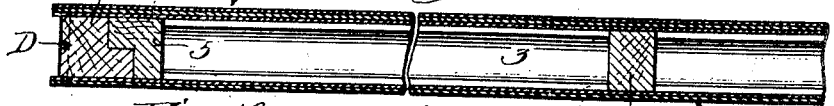
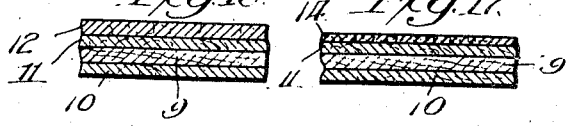
Inventor
George E. Kloote,
by Wm. F. Freudenreich
atty Patented May 7, 1940

2,199,938

UNITED STATES PATENT OFFICE 2,199,938

FLOOR PANEL FOR AIRCRAFT

George E. Kloote, Grand Rapids, Mich., assignor to Haskelite Manufacturing Corporation, a corporation of New York Application February 10, 1938, Serial No. 189,823

2 Claims. (Cl. 20—91)

Wood floors for aircraft, particularly throughout compartments for passengers, are deemed so essential that, in order to secure such floors without adding too greatly to the dead weight of the structures, resort is had to light hollow wood panels fabricated in such a manner as to provide the necessary strength and rigidity at a weight much lower than that of solid wood flooring.

The object of the present invention is so to construct panels of the aforesaid type that they shall be rugged and durable, efficient in use and of uniform quality, even though an indefinite number of panels are manufactured.

In one of its aspects, the present invention may be regarded as a novel panel; but, since the attainment of the desired structural characteristics depends largely on the proper fitting and assembly of the constituent parts of a panel, the invention, in another aspect, may be regarded as comprising a novel method of manufacturing hollow compound wood panels.

My improved flooring may be said to comprise two light parallel plywood panels spaced apart by light beams or ribs bonded thereto; the two endmost ribs cooperating with two longitudinal members connecting corresponding ends of the ribs or light beams together, to form a frame fitted between the plywood panels and overlapped by the marginal portions of the latter. Flooring of this type is usually supported on sills or beams forming part of the aircraft structure and so spaced apart from each other that the internal ribs in the flooring span the distance between the same. Thus the load on the flooring must be distributed from the ribs or light beams in the flooring to the sills or other supports underlying opposite marginal portions of the flooring. One of the objects of the present invention is to insure that the transmission of the load from the ribs in the flooring to the underlying supports will be done uniformly and to distribute the load along the margins of the flooring instead of concentrating it at the rib ends.

The only way in which the transmitted load can be distributed beyond the regions of the individual ribs is to fasten the rib ends firmly together by means of the adjacent frame members along the edges of the adjacent flooring members.

One of the objects of the present invention is to produce a simple and novel form of connection between the rib ends and the corresponding frame members, which insures a substantially perfect distribution of the load that is being transmitted from the flooring to the underlying supports.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a plan view of one of my improved flooring members or sections having a portion of the upper plywood facing broken away; Fig. 2 is a side view and Fig. 3 an end view of the panel shown in Fig. 1; Fig. 4 is a section on a larger scale, taken approximately on line 4—4 of Fig. 1; Fig. 5 is a section on line 5—5 of Fig. 1, on the same scale as Fig. 4; Fig. 6 is a section, on the same scale as Figs. 4 and 5, on the staggered line 6—6 of Fig. 4; Fig. 7 is a perspective view of one of the spacing blocks between ribs before being assembled in the structure; Fig. 8 is a perspective view of one end of one of the longitudinal frame members of the flooring; Fig. 9 is a perspective view of a fragment of the flooring, on a much larger scale than the preceding figures, parts being broken away to illustrate the interior construction; Fig. 10 is a plan view on the same scale as Fig. 1, illustrating the method of forming a grille of the ribs or light core beams and spacing blocks; Fig. 11 is a section on line 11—11 of Fig. 10, but on a larger scale; Fig. 12 is a section on line 12—12 of Fig. 11, showing only a fragment of the grille after it has been glued together; Fig. 13 is a view similar to Fig. 12, showing the edge of the grille trimmed and shaped to fit against an L-shaped longitudinal frame member that extends transversely of the ribs; Fig. 14 is a view similar to Figs. 12 and 13, showing the longitudinal frame member glued to the edge of the grille; Fig. 15 is a view similar to Fig. 14, illustrating the structure after the face panels have been applied to the grille; and Figs. 16 and 17 are two sectional views showing two modified forms of upper face panels.

Referring to Figs. 1 to 9 of the drawings, 1 and 2 represent light plywood panels bonded to light beams or ribs 3 arranged between the same. In a typical flooring, the thickness of the structure as a whole may be about nine-sixteenths of an inch, and it may be somewhat more than sixteen inches wide, and three feet or more in length. What may be regarded as the core of the structure includes not only the ribs 3, but also a frame 4 lying between the two plywood panels and following along the four edges of the latter; the frame members having the same thickness as the depth of the ribs, so that the plywood facings may be glued or bonded simultaneously to the ribs and to the frame. The ribs run across the narrow dimension of the flooring and engage with and are firmly connected to the longitudinal members of the frame 4. This connection is brought about by fitting between the ends of each adjacent pair of ribs wood blocks 5 having the grain of the wood running parallel with the length of the ribs; these blocks being glued or bonded to the ribs so as to form with the latter a continuous or solid body from one end of the flooring panel to the other. The outer ends of the spacing blocks and of the ribs are cut away to produce a step formation such as best shown in Figs. 5 and 9; this step formation fitting against and being bonded to a complementary formation on the adjacent longitudinal member of the frame 4. Thus, the blocks 5 serve not only to space the ribs apart and hold them against tilting, but also as widened portions or flanges on the ends of the ribs that help secure the ribs to the longitudinal frame member and to distribute the load along the frame member, when it is transmitted from the ribs to the latter. There may be other spacing blocks 6 between the ribs at points remote from the ends. In the arrangement shown, there is a line or row of such blocks at about the longitudinal center of the flooring. One of these blocks is shown in Fig. 7, which also illustrates the blocks 5 before they have been assembled in the grille and shaped as heretofore explained.

When the flooring is supported from beneath, adjacent to its longitudinal edges, and bears a load, the upper portions of the ribs tend to move lengthwise in one direction, and the lower portions of the ribs tend to move in the opposite direction, so that the middle portion of each rib is subjected to shearing stresses and must therefore be thick enough to resist them. In a flooring of this kind which is, say, nine-sixteenths of an inch thick, ribs of spruce, spaced an inch or an inch and one-eighth between centers, need not have a thickness greater than about one-eighth of an inch. However, in order to improve the bonding between the ribs and the face panels, I prefer to thicken the ribs along the top and bottom, thereby providing wide faces for engagement with the facing panels. In other words, the ribs are preferably I beams.

The facings 1 and 2 may be variously constructed. Usually the bottom facing is composed of two plies of wood veneer; the grain of the wood of the inner ply 7, as best shown in Fig. 9, being transverse to the ribs or light beams 3; while the grain of the undermost or outer ply 8 is approximately parallel to the grain in the ribs. Thus, when the floor is loaded and the bottom facing is in tension, the stresses in the ply 8 are in the direction of the length of the fibers, whereas the stresses in the ply 7 are crosswise of the fibers; thus giving to the floor a greater strength in bending than would be true if the directions of the grains in the two plies 7 and 8 were interchanged.

When the flooring or panel is loaded, the upper facing is under compression. This facing may comprise three plies 9, 10 and 11; the ply 9 lying between the other two, ordinarily being thicker than either of the others, and having its grain running in the general direction of the length of the ribs. The grain of the wood in the plies 10 and 11 is transverse to that in the intermediate ply 9 and that in the ribs. Since the ply 11 constitutes the wearing surface of the flooring, it consists preferably of a hard wood as, for example, birch. The plies 7, 8, 9 and 10 may be formed of softer wood as, for example, poplar. In the case of a flooring panel having the thickness of the example heretofore given, the ply 9 may have a thickness of one twenty-eighth of an inch, while the other four plies may all be about one forty-eighth of an inch thick.

In Figs. 16 and 17 are shown fragments of modified forms of top facing panels for the flooring to provide good wearing surfaces and also, in one case, some protection against fire. Thus, in Fig. 16, the upper facing panel just described has overlying the same and bonded thereto a layer 12 of impregnated asbestos about one thirty-second of an inch thick. In Fig. 17 there is a layer of tough fiber board somewhat less than one sixtieth of an inch thick overlying and bonded to the three ply structure.

The empty spaces or compartments within the completed composite flooring panel may be filled with any suitable, light-weight sound deadening material as, for example, kapok or expanded Vermiculite. The filling material, while providing heat insulation, has the more important function, however, of absorbing sound waves and reducing noise. In Figs. 4 and 6 there is illustrated a sound absorbing and heat insulating filling material 15.

It is very important that what may be called the longitudinal members 16 of the frame 4 be properly bonded to the adjacent ends of the ribs or light beams. In order to secure uniformity of bonds, it is necessary that the ribs be very accurately cut in order that they may be of exactly the same lengths. While it is not impossible to secure exact uniformity of length throughout a large number of ribs, it is a difficult and tedious matter to build up a satisfactory grille-like core based on accurately preformed ribs. I have therefore devised a novel method whereby the desired results are achieved in a very simple way. Instead of attempting extreme accuracy in the initial lengths of the ribs, I employ ribs that are sufficiently long, although some of them may be slightly longer than is necessary. The ribs with the spacing blocks 6 between the same, at the ends of the strips and at the middle or any other point or points where spaces are desired, are then assembled as indicated in Figs. 10 and 11, on a suitable table A, a suitable adhesive having been applied to the spacing blocks to bond them to the ribs, and the assembly is then clamped together until the blocks and the ribs have become bonded to each other. While the end members 17 of the frame 4 may serve as ribs, the construction of the frame may be such that these frame members should not be included as a part of the preformed grille. In such case, the necessary number of spacing blocks may be placed between the rib at each end of the series and the corresponding clamping ledge B or C on the table. In the arrangement shown, the ledge B is stationary, and the ledge C is adjustable and is adapted to press the assembly toward the stationary ledge. If the bars 17 have flat inner faces, the spacing blocks that engage with the clamping ledges should have flat faces engaging with the latter; such blocks being shown at 6a in Fig. 11.

After the ribs and the spacers have been bonded together, the grille has the appearance of two longitudinal rails connected together by numerous cross pieces, each rail being composed of a number of spacing blocks arranged in line with each other and alternating with sections of the ribs. Fig. 12 is a sectional view illustrating the condition at this time, the plane of the section being at right angles to one of the rails, namely, parallel with the ribs. Each of the rails is then trimmed so that the spacing block members thereof, as viewed in the same plane as Fig. 12 have the more or less L-shaped section found in the blocks 5 in Fig. 13. In cutting away portions of the blocks 5, corresponding excisions are, of course, made in the extreme ends of the ribs, so that each longitudinal edge of the grille contains a deep rabbet cut into the under face of the grille and extending throughout the entire length of the structure; this rabbet giving a step formation to the longitudinal edges of the grille. It will be seen that it is a simple matter to machine the longitudinal edges of the grille very accurately to give them this step formation, so that edges which are perfectly straight throughout their lengths are easily obtainable. It is then only a matter of shaping the longitudinal bars 16 of the frame 4 so as to provide them with edge contours complementary to the edge contours of the grille. After this has been done, the parts of the frame, including the bars 16, are assembled as a border for the grille; the meeting edge faces of the grille and of the bars 16 being bonded together in a suitable manner. The bars 16 are made thick enough in the plane of the floor panel, to permit some trimming thereof later.

After the grille, with its surrounding frame, has been completed, it is assembled with the two facing panels 1 and 2, as indicated in Fig. 15, with suitable adhesive material interposed between the faces of the grille-like core and the facings, and the assembly is subjected to the proper conditions to affect a bonding together of the core and facings. The finished product is now a little wider than the width that the panel is to have. It is therefore trimmed at each long edge so as to bring it to the right width. Thus, as indicated in Fig. 15, a little strip is sawed off along each long edge of the panel in the plane of the dotted line D.

It will thus be seen that all of the transverse dimensions of the panel or of the parts of which it is constructed, are produced by operations each of which acts throughout the entire length of the panel, instead of requiring many operations each of which determines the dimension of only a small part or element. Thus, extreme accuracy is secured quickly and with very little effort.

It will be seen that the frame members or bars 16 and the cooperating rail members of the preliminary grid are so shaped that portions of the bars underlie the spacing blocks and also the ends of the ribs, thus bringing into play the capacity of the wood to resist shearing stresses, when the floor is loaded, instead of imposing such stresses entirely on the bonds between the frame members 16 and the grille.

Since the blocks 5 are bonded firmly to the ribs and have their grain running in the same direction as the grain in the ribs, the blocks in effect form flanges or lateral extensions of the ribs themselves and transmit the load from the ribs to the frame members 16 just as though one-half of each block were integral with the rib to which that half is bonded.

One of the valuable characteristics of my improved flooring is that it stands up admirably under concentrated loads such as are imposed, for example, by the weight borne by the usual small heel of a woman's shoe. Such concentrated loads tend to bend the panel sharply crosswise of the ribs. In the present construction, the plywood facing panels serve to distribute such loads between a number of ribs, this effect being increased by the fact that each rib has wide faces bonded to the facing panels; the I section of the ribs causing them to be very stiff in transverse bending.

I claim:

1. A compound hollow floor panel comprising a flat core composed of parallel wood ribs in which the grain runs lengthwise, wide, short wood spacing blocks closing the gaps between and bonded to the ribs at their ends so as to secure all of the ribs together, the grain of the wood in the spacing blocks extending in the same general direction as that in the ribs; the ribs and the spacing blocks being cut away on the under sides thereof to form deep rabbets along the longitudinal edges of the core, and bars of wood fitting against the end faces of the ribs and blocks and having portions fitting in and filling said rabbets, the bars, ribs and blocks being bonded together; and facing panels of plywood bonded to the broad faces of the core.

2. A hollow wood floor panel comprising a flat core member composed of parallel wood ribs I-shaped in cross section, in which the grain runs lengthwise, spaced apart at their upper and lower chords, short, wide wood spacers closing the gaps between and bonded to the ribs at their ends so as to secure all of them together, the grain of the wood in the spacers extending in the same general direction as that in the ribs, the tops and bottoms of the spacers being flush with the upper and lower surfaces, respectively, of the ribs the edges of the core member extending along the ends of the ribs containing surfaces extending in the same general direction as the grain of the wood in the ribs and spacers, and bars of wood fitting against and bonded to said edges, including the aforesaid surfaces.

GEORGE E. KLOOTE.